United States Patent
Oh et al.

(10) Patent No.: US 12,062,759 B2
(45) Date of Patent: Aug. 13, 2024

(54) ELECTROLYTE FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Jeong Woo Oh, Daejeon (KR); Chul Haeng Lee, Daejeon (KR); Hyun Seung Kim, Daejeon (KR); Hyung Tae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 586 days.

(21) Appl. No.: 17/416,218

(22) PCT Filed: Jan. 17, 2020

(86) PCT No.: PCT/KR2020/000879
§ 371 (c)(1),
(2) Date: Jun. 18, 2021

(87) PCT Pub. No.: WO2020/149705
PCT Pub. Date: Jul. 23, 2020

(65) Prior Publication Data
US 2022/0077498 A1   Mar. 10, 2022

(30) Foreign Application Priority Data
Jan. 17, 2019 (KR) ............ 10-2019-0006405
Jan. 16, 2020 (KR) ............ 10-2020-0005939

(51) Int. Cl.
*H01M 10/0567* (2010.01)
*H01M 10/0525* (2010.01)
*H01M 10/42* (2006.01)

(52) U.S. Cl.
CPC ... *H01M 10/0567* (2013.01); *H01M 10/0525* (2013.01); *H01M 10/4235* (2013.01)

(58) Field of Classification Search
None
See application file for complete search history.

(56) References Cited

U.S. PATENT DOCUMENTS

| | | |
|---|---|---|
| 8,092,661 B2 | 1/2012 | Canonne et al. |
| 2001/0024749 A1 | 9/2001 | Michot et al. |
| 2002/0009650 A1 | 1/2002 | Michot et al. |
| 2002/0102380 A1 | 8/2002 | Michot et al. |
| 2003/0052310 A1 | 3/2003 | Michot et al. |
| 2003/0066988 A1 | 4/2003 | Michot et al. |
| 2004/0185347 A1 | 9/2004 | Kim et al. |
| 2005/0074668 A1 | 4/2005 | Michot et al. |
| 2005/0123831 A1 | 6/2005 | Michot et al. |
| 2008/0199773 A1 | 8/2008 | Deguchi et al. |
| 2012/0219865 A1 | 8/2012 | Kaneko et al. |
| 2016/0240889 A1 | 8/2016 | Cheng et al. |
| 2018/0342767 A1 | 11/2018 | Ahn et al. |
| 2019/0058216 A1 | 2/2019 | Oh et al. |
| 2019/0074545 A1 | 3/2019 | Jeong et al. |
| 2019/0198925 A1 | 6/2019 | Lee et al. |
| 2022/0344715 A1* | 10/2022 | Kang ............ H01M 10/4235 |

FOREIGN PATENT DOCUMENTS

| | | |
|---|---|---|
| CN | 103000942 A | 3/2013 |
| CN | 106935906 A | 7/2017 |
| CN | 108352569 A | 7/2018 |
| CN | 108886169 A | 11/2018 |
| EP | 3457485 A1 | 3/2019 |
| JP | 2000508346 A | 7/2000 |
| JP | 2002280063 A | 9/2002 |
| JP | 2003217655 A | 7/2003 |
| JP | 2005327566 A | 11/2005 |
| JP | 2008204788 A | 9/2008 |
| JP | WO2011052428 A1 | 3/2013 |
| JP | 2014-127354 * | 7/2014 |
| JP | 2014127354 A | 7/2014 |
| JP | 2014235986 A | 12/2014 |
| JP | 2017004986 A | 1/2017 |
| KR | 20040080775 A | 9/2004 |
| KR | 20180026358 A | 3/2018 |
| KR | 20180065958 A | 6/2018 |
| KR | 20180083272 A | 7/2018 |
| WO | 2011052428 A1 | 5/2011 |
| WO | 2018106078 A1 | 6/2018 |
| WO | WO2018/131952 * | 7/2018 |

OTHER PUBLICATIONS

Machine translation of JP2014-127534, published on Jul. 7, 2014 (Year: 2014).*
Machine translation of CN 103000942, published on Mar. 27, 2013 (Year: 2013).*
Search report from International Application No. PCT/KR2020/000879, mailed Apr. 29, 2020.
Zhang, Qingqing., et al., "Recent advances in solid polymer electrolytes for lithium batteries." Nano Research, vol. 10, No. 12, Received Apr. 23, 2017; Accepted Jul. 11, 2017, pp. 1-36.
Devaux, Didier, et al., "Crosslinked perfluoropolyether solid electrolytes for lithium ion transport." Solid State Ionics, vol. 310, Available online Aug. 17, 2017, pp. 71-80.
Ates, Murat, et al., "Process in Organic Coatings." vol. 65, Received May 5, 2008; Accepted Dec. 16, 2008, pp. 281-287.
Extended European Search Report for Application No. 20741559.7 dated Feb. 25, 2022, pp. 1-5.

* cited by examiner

*Primary Examiner* — Anca Eoff
(74) *Attorney, Agent, or Firm* — Lerner David LLP

(57) ABSTRACT

An electrolyte for a lithium secondary battery and a lithium second battery including the same are disclosed herein. In some embodiments, an electrolyte includes an additive containing a compound represented by Formula 1, an oligomer containing a unit represented by Formula 2 and having an acrylate group at an end thereof, a lithium salt, and an organic solvent.

12 Claims, No Drawings

ELECTROLYTE FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2020/000879, filed on Jan. 17, 2020, which claims priority from Korean Patent Application Nos. 10-2019-0006405, filed on Jan. 17, 2019, and 10-2020-0005939, filed on Jan. 16, 2020, the disclosures of which are incorporated by reference herein.

TECHNICAL FIELD

The present invention relates to an electrolyte for a lithium secondary battery and a lithium secondary battery including the same, and more particularly, to an electrolyte for a lithium secondary battery in which battery performance at a high voltage or high temperature is improved.

BACKGROUND ART

There is a need to develop technology for efficiently storing and utilizing electrical energy as personal IT devices and computer networks are developed with the development of information society and the accompanying dependency of society as a whole on the electrical energy is increased.

Among the technologies developed for this purpose, a technology based on secondary batteries is the most suitable technology for various applications. Since a secondary battery may be miniaturized to be applicable to a personal IT device and may be applied to an electric vehicle and a power storage device, there emerges an interest in the secondary battery. Among these secondary batteries, lithium ion batteries, which are battery systems having high energy density, are in the spotlight, and are currently being used in various devices.

Unlike the early days when lithium metal was directly applied to the system, the lithium ion battery system is being realized as a system in which lithium metal is not directly used in the battery, for example, a transition metal oxide material containing lithium is used as a positive electrode material, and a carbon-based material, such as graphite, and an alloy-based material, such as silicon, are used as a negative electrode material in a negative electrode.

The lithium ion battery is largely composed of a positive electrode formed of a transition metal oxide containing lithium, a negative electrode capable of storing lithium, an electrolyte solution that becomes a medium for transferring lithium ions, and a separator, and, among them, a significant amount of research on the electrolyte solution has been conducted while the electrolyte solution is known as a component that greatly affects stability and safety of the lithium ion battery.

The electrolyte solution for a lithium ion battery is composed of a lithium salt, an organic solvent dissolving the lithium salt, and a functional additive, wherein proper selection of these components is important to improve electrochemical properties of the battery. As a representative lithium salt currently used, $LiPF_6$, $LiBF_4$, LiFSI (lithium fluorosulfonyl imide, $LiN(SO_2F)_2$), LiTFSI (lithium (bis) trifluoromethanesulfonyl imide, $LiN(SO_2CF_3)_2$), or LiBOB (lithium bis(oxalate) borate, $LiB(C_2O_4)_2$) is being used, and, with respect to the organic solvent, a carbonate-based organic solvent, an ester-based organic solvent, or ether-based organic solvent is being used.

With respect to the lithium ion battery, an increase in resistance and a decrease in capacity during charge and discharge or storage at high temperatures have been suggested as a serious problem in degradation of performance, and one of causes of the problem suggested is a side reaction caused by deterioration of the electrolyte solution at high temperatures, particularly deterioration due to decomposition of the salt at high temperatures. In a case in which a by-product of the salt is activated and then decomposes films formed on surfaces of the positive electrode and the negative electrode, there is a problem of decreasing passivation ability of the film, and, as a result, this may cause additional decomposition of the electrolyte solution and accompanying self-discharge.

Particularly, with respect to a negative electrode among electrode materials of the lithium ion battery, a graphite-based negative electrode is mostly used, wherein, with respect to graphite, since its operating potential is 0.3 V (vs. $Li/Li^+$) less an or which is lower than electrochemical stabilization window of an electrolyte solution used in the lithium ion battery, the currently used electrolyte solution is reduced and decomposed. The reduced and decomposed product transmits lithium ions, but forms a solid electrolyte interphase (SEI) that suppresses the additional decomposition of the electrolyte solution.

However, in a case in which the SEI does not have sufficient passivation ability to such an extent that it may suppress the additional decomposition of the electrolyte solution, since the electrolyte solution is additionally decomposed during storage, the charged graphite is self-discharged, and as a result, a phenomenon occurs in which a potential of the entire battery is reduced. Thus, in order to maintain the passivation ability of the SEI at high temperatures, it is urgent to propose and introduce an additive which may suppress damage to the SEI by scavenging HF and $PF_5$, decomposition products of $LiPF_6$ as a typical lithium salt, which are generated due to heat/moisture, or which may further form an additional stable film on the SEI that is formed on the positive/negative electrodes.

PRIOR ART DOCUMENT

Japanese Patent Application Laid-open Publication No. 2003-217655

DISCLOSURE

Technical Problem

In view of the above problems, an aspect of the present invention provides an electrolyte for a lithium secondary battery, in which high-temperature characteristics of the lithium secondary battery are improved by suppressing a side reaction caused by a by-product generated when a lithium salt is decomposed at a high voltage or high temperature, and a lithium secondary battery including the same.

Technical Solution

According to an aspect of the present invention, there is provided an electrolyte for a lithium secondary battery which includes: an additive containing a compound represented by Formula 1; an oligomer containing a unit represented by Formula 2 and having an acrylate group at an end thereof; a lithium salt; and an organic solvent.

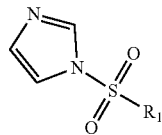

[Formula 1]

In Formula 1, $R_1$ is selected from the group consisting of an alkyl group having 1 to 5 carbon atoms which is unsubstituted or substituted with a halogen, an alkoxy group having 1 to 5 carbon atoms which is unsubstituted or substituted with a halogen, a phenyl group which is unsubstituted or substituted with an alkyl group having 1 to 3 carbon atoms, and an amine group which is unsubstituted or substituted with an alkyl group having 1 to 5 carbon atoms.

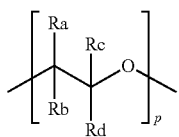

[Formula 2]

In Formula 2, $R_a$, $R_b$, $R_c$, and $R_d$ are each independently fluorine or an alkyl group having 1 to 3 carbon atoms which is unsubstituted or substituted with fluorine, and p is an integer of 1 to 50.

According to another aspect of the present invention, there is provided a lithium secondary battery including a positive electrode; a negative electrode; and the electrolyte for a lithium secondary battery of the present invention.

Advantageous Effects

Since an electrolyte for a lithium secondary battery according to the present invention includes a specific oligomer and an additive, high-temperature performance is excellent and degradation of battery performance may be minimized even when a voltage is increased.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, the expression "weight-average molecular weight" may denote a standard polystyrene-equivalent value measured by gel permeation chromatography (GPC), and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used this case, and tetrahydrofuran (THF) may be used as a solvent.

Electrolyte for Lithium Secondary Battery

An electrolyte for a lithium secondary battery according to the present invention includes: an additive containing a compound represented by Formula 1; an oligomer containing a unit represented by Formula 2 and having an acrylate group at an end thereof; a lithium salt; and an organic solvent.

Hereinafter, each component of the electrolyte for a lithium secondary battery of the present invention will be described in more detail.

(1) Additive

First, the additive will be described. The additive includes a compound represented by Formula 1 below, and other additives may be further added depending on a type of an electrode used or the use of the battery.

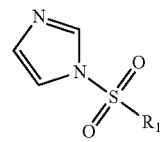

[Formula 1]

In Formula 1, $R_1$ may be selected from the group consisting of an alkyl group having 1 to 5 carbon atoms which is unsubstituted or substituted with a halogen, an alkoxy group having 1 to 5 carbon atoms which is unsubstituted or halogen, a phenyl group which is substituted with a unsubstituted or unsubstituted with an alkyl group having 1 to 3 carbon atoms, and an amine group which is unsubstituted or substituted with an alkyl group having 1 to 5 carbon atoms.

Since transition metal is dissolved from a positive electrode and an unstable solid electrolyte interphase (SEI) is formed on a surface of a negative electrode when an operating voltage of the lithium secondary battery is increased or the battery is exposed to high temperature, there is a limitation in that an additional decomposition reaction of the electrolyte is not suppressed during repeated charge and discharge of the battery.

With respect to the present invention, in order to address the above-described limitation, the compound represented by Formula 1 was added to the electrolyte and used to prevent the decomposition reaction of the electrolyte and the decomposition of the SEI by further forming a passive layer on interface an between the positive/negative electrodes. The compound represented by Formula 1 may improve the degradation of performance of the battery by preventing adhesion of transition metal ions dissolved from a positive electrode active material on the negative electrode through the formation of the solid electrolyte interphase (SEI) on the interface of the positive electrode. Also, the compound represented by Formula 1 may suppress the additional decomposition reaction of the electrolyte by forming the passive layer on the interface between the positive/negative electrodes.

As a specific example, the compound represented by Formula 1 may include at least one selected from the group consisting of compounds represented by Formulae 1A to 1E below.

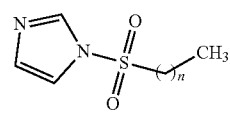

[Formula 1A]

In Formula 1A, n is an integer of 0 to 4.

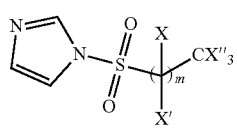

[Formula 1B]

In Formula 1B, m is an integer of 0 to 4, x, x', and X" are each independently one of hydrogen or a halogen, and at least one of X, X', and X" is a halogen.

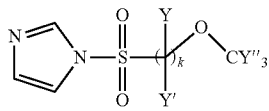

[Formula 1C]

In Formula 1C, k is an integer of 0 to 4, Y, Y', and Y" are each independently one of hydrogen or a halogen, and at least one of Y, Y', and Y" is a halogen.

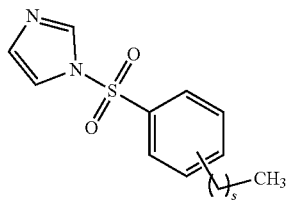

[Formula 1D]

In Formula 1D, s is an integer of 0 to 2.

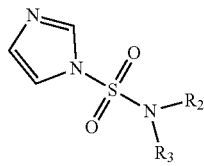

[Formula 1E]

In Formula 1E, $R_2$ and $R_3$ are each independently hydrogen or an alkyl group having 1 to 5 carbon atoms.

More specifically, the compound represented by Formula 1A may include compounds represented by Formulae 1A-1 to 1A-3 below.

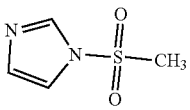

[Formula 1A-1]

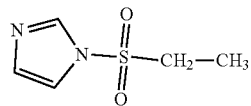

[Formula 1A-2]

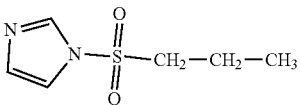

[Formula 1A-3]

Also, the compound represented by Formula 1B may include a compound represented by Formula 1B-1 below.

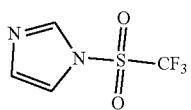

[Formula 1B-1]

Furthermore, the compound represented by Formula 1C may include at least one selected from the group consisting of compounds represented by Formulae 1C-1 to 1C-5 below.

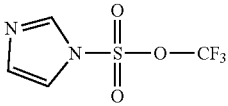

[Formula 1C-1]

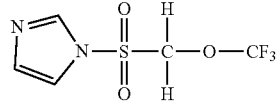

[Formula 1C-2]

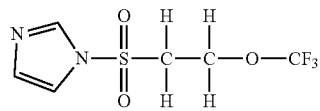

[Formula 1C-3]

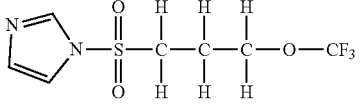

[Formula 1C-4]

[Formula 1C-5]

Also, the compound represented by Formula 1D may include a compound represented by Formula 1D-1 below.

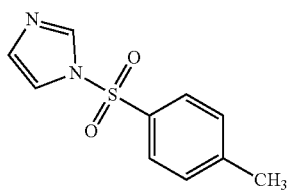

[Formula 1D-1]

Furthermore, the compound represented by Formula 1E may include a compound represented by Formula 1E-1 below.

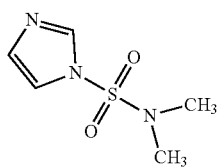

[Formula 1E-1]

The compound represented by Formula 1 may be included in an amount of 0.1 part by weight to 5 parts by weight, preferably 0.1 part by weight to 3 parts by weight, and more preferably 0.1 part by weight to 1 part by weight based on 100 parts by weight of the electrolyte for a lithium secondary battery. In a case in which the compound represented by Formula 1 is included in an amount with the above range, a lithium salt by-product, such as $PF_5$, may be effectively scavenged while controlling an increase in internal resistance.

In addition to the above-listed components, in order to impart an effect of reducing resistance in the battery depending on the use of the battery and a configuration of the battery, the additive according to the present invention may selectively further include other additives capable of realizing the physical properties known in the art. As the other additives, for example, other additives, such as vinylene carbonate (VC), vinyl ethylene carbonate (VEC), propane sultone (PS), succinonitrile (SN), adiponitrile (AdN), ethylene sulfate (ESa), sultone (PRS), propene fluoroethylene carbonate (FEC), lithium difluorophosphate ($LiPO_2F_2$), lithium difluoro (oxalate) borate (LiODFB), lithium bis-(oxalato) borate (LiBOB), 3-trimethoxysilanyl-propyl-N-aniline (TMSPa), and tris(trimethylsilyl)phosphite (TMSPi), may be used.

(2) Oligomer

Next, the oligomer containing a unit represented by Formula 2 and having an acrylate group at an end thereof will be described.

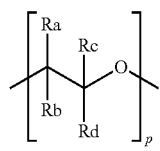

[Formula 2]

In Formula 2, $R_a$, $R_b$, $R_c$ and $R_d$ are each independently fluorine or an alkyl group having 1 to 3 carbon atoms which is unsubstituted or substituted with fluorine, and p is an integer of 1 to 50.

Since the oligomer containing a unit represented by Formula 2 and having an acrylate group at an end thereof includes an ethylene group substituted with fluorine having low reactivity with lithium ions, a side reaction of the lithium ions and a decomposition reaction of the lithium salt may be controlled, and thus, a side reaction, which occurs when the high-concentration lithium salt is used, may be suppressed. Also, since the oligomer contains fluorine with excellent flame retardancy, heat generation and ignition phenomenon of the lithium secondary battery are suppressed when the electrolyte including the oligomer is used, and thus, high-temperature safety may be improved.

Since the oligomer contains the unit containing a hydrophobic fluorine element and simultaneously contains a hydrophilic acrylate group at the end thereof, the oligomer may act as a surfactant to reduce surface resistance with an electrode interface, and thus, wetting of the lithium secondary battery may be improved.

Specifically, the oligomer may be an oligomer represented by Formula 2A below.

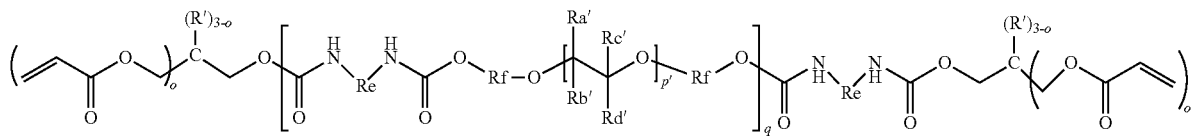

[Formula 2A]

In Formula 2A, $R_a'$, $R_b'$, $R_c'$, and $R_d'$ are each independently a fluorine element or an alkyl group having 1 to 3 carbon atoms which is unsubstituted or substituted with fluorine, $R_e$ is an aliphatic hydrocarbon group or an aromatic hydrocarbon group, $R_f$ is an alkylene group having 1 to 5 carbon atoms which is unsubstituted or substituted with fluorine, R' is hydrogen or an alkyl group having 1 to 3 carbon atoms, is an integer of 1 to 3, p' is an integer of 1 to 50, and q is an integer of 1 to 15.

In this case, p' may preferably be an integer of 1 to 45, and may more preferably be an integer of 1 to 40.

In the oligomer represented by Formula 2A, the aliphatic hydrocarbon group includes an alicyclic hydrocarbon group or a linear hydrocarbon group.

The alicyclic hydrocarbon group may include at least one selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms.

The linear hydrocarbon group may include at least one selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; a substituted and a or unsubstituted alkynylene group having 2 to 20 carbon atoms.

Furthermore, in the oligomer represented by Formula 2A, the aromatic hydrocarbon group may include a substituted or unsubstituted arylene group having 6 to 20 carbon atoms; or a substituted or unsubstituted heteroarylene group having 2 to 20 carbon atoms.

As a specific example, the oligomer represented by Formula 2A may be an oligomer represented by Formula 2A-1 below.

[Formula 2A-1]

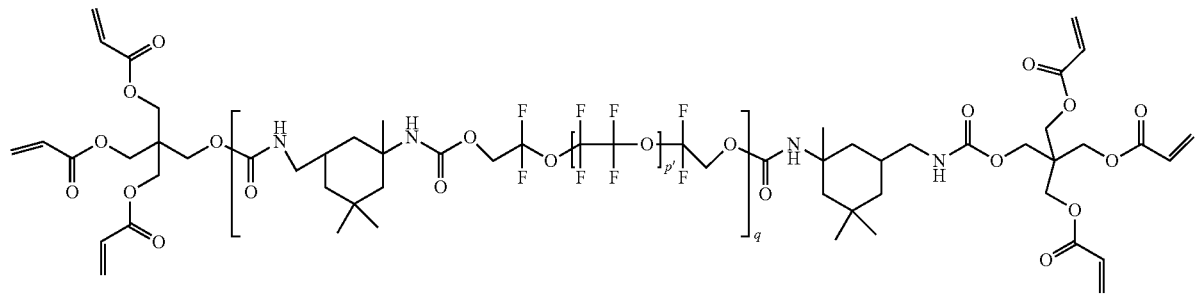

In Formula 2A-1, p' is an integer of 1 to 50, and q is an integer of 1 to 15. p' may preferably be an integer of 1 to 45, and may more preferably be an integer of 1 to 40.

Also, the oligomer may be an oligomer represented by Formula 2B below.

[Formula 2B]

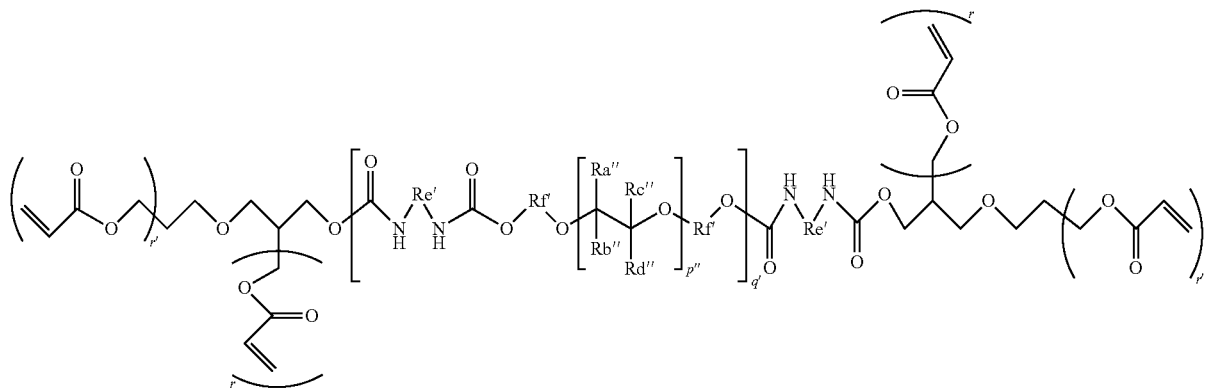

In Formula 2B, $R_a''$, $R_b''$, $R_c''$, and $R_d''$ are each independently a fluorine element or an alkyl group having 1 to 3 carbon atoms which is unsubstituted or substituted with fluorine, $R_e'$ is an aliphatic hydrocarbon group or an aromatic hydrocarbon group, $R_f'$ is an alkylene group having 1 to 5 carbon atoms which is unsubstituted or substituted with fluorine, r is an integer of 1 to 2, r' is an integer of 1 to 3, p'' is an integer of 1 to 50, and q' is an integer of 1 to 15. p'' may preferably be an integer of 1 to 45, and may more preferably be an integer of 1 to 40.

As a specific example, the oligomer represented by Formula 2B may be an oligomer represented by Formula 2B-1 below.

[Formula 2B-1]

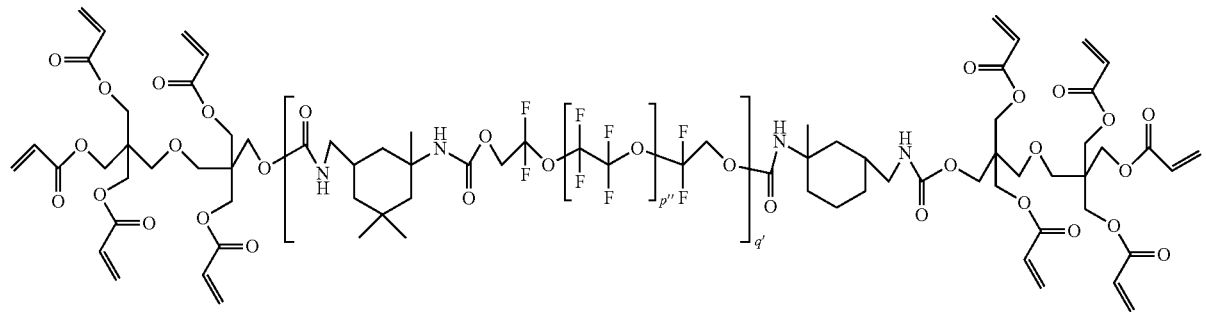

In Formula 2B-1, p" is an integer of 1 to 50, and q' is an integer of 1 to 15. In this case, p" may preferably be an integer of 1 to 45, and may more preferably be an integer of 1 to 40.

A weight-average molecular weight (Mw) of the oligomer may be controlled by the number of repeating units, and may be in a range of about 500 to about 200,000, particularly 1,000 to 150,000, and more particularly 2,000 to 100,000. In a case in which the weight-average molecular 100,000. weight of the oligomer is within the above range, the oligomer may be well dispersed due to high affinity with the organic solvent, wetting of the electrolyte may be improved by reducing the surface tension below a predetermined level, the decomposition reaction of the lithium salt may be suppressed, and a side reaction caused by lithium ions may be prevented.

In this case, the oligomer may be included in an amount of 0.1 part by weight to 5 parts by weight, preferably 0.1 part by weight to 3 parts by weight, and more preferably 0.1 part by weight to 1 part by weight based on 100 parts by weight of the electrolyte for a lithium secondary battery. In a case in which the oligomer is included in an amount with the above range, since the oligomer maintains mobility and ionic conductivity of lithium ions above a predetermined level, the oligomer may act as a surfactant while suppressing the side reaction, and thus, interfacial resistance in the battery may be minimized.

(3) Lithium Salt

The lithium salt may be included in a molar concentration of 1 M to 3 M, preferably 1 M to 2 M, and more preferably 1 M to 1.5 M in the electrolyte for a lithium secondary battery. In a case in which the lithium salt is included within the above molar concentration range, since lithium ions are supplied, output sufficiently characteristics of the battery may be improved by improving a lithium ion yield (Lit transference number) and a degree of dissociation of the lithium ions.

Typically, the lithium salt may include at least one compound selected from the group consisting of $LiPF_6$, $LiBF_4$, $LiSbF_6$, $LiAsF_6$, $LiClO_4$, $LiN(C_2F_5SO_2)_2$, $LIN(CF_3SO_2)_2$, $CF_3SO_3Li$, $LiC(CF_3SO_2)_3$, $LiC_4BO_8$, LiTFSI, LiFSI, and $LiClO_4$, and may preferably include $LiPF_6$ and/or $LiBF_4$, but the present invention is not limited thereto.

Among the lithium salts, $LiPF_6$ and/or $LiBF_4$ are particularly widely used because they generally have high ionic conductivity. However, in a case in which an organic solvent is decomposed at high temperature, a decomposition product of the organic solvent and $PF_6$, as an anion of the lithium salt, may react with each other to generate a Lewis acid by-product such as $PF_5$. With respect to the Lewis acid by-product, it promotes a spontaneous decomposition reaction of the organic solvent and causes a side reaction that collapses the SEI formed on the electrode interface. In a case in which the side reaction is not suppressed, the resistance in the battery may be rapidly increased, and capacity characteristics of the battery may be degraded.

Specifically, in a case in which $LiPF_6$ is used as the lithium salt, $PF_6$, as an anion, may lose electrons on a negative electrode side and $PF_5$ may be formed. In this case, the following chemical reaction may proceed in a chain-wise manner.

$LiPF_6 \leftrightarrows LiF + PF_5$ $PF_5 + H_2O \rightarrow POF_3 + 2HF$ $POF_3 + H_2O \rightarrow POF_2(OH) + HF$ $POF_3 + 2xLi^+ + 2xe^- \rightarrow Li_xPF_{3-x}O + xLiF$ In a case in which the chain reaction is in progress, since other by-products, including HF generated, may cause the decomposition of the organic solvent or the side reaction with the SEI, the performance of the battery may be continuously degraded. Thus, with respect to the present invention, in order to address the above-described limitation, the additive containing the above-described compound represented by Formula 1 and the oligomer containing the unit represented by Formula 2 and having the acrylate group at the end thereof are added to the electrolyte for a lithium secondary battery and used.

(4) Organic Solvent

In a non-aqueous electrolyte solution for a lithium secondary battery according to the present specification, the organic solvent may include a cyclic carbonate-based organic solvent, a linear carbonate-based organic solvent, or a mixed organic solvent thereof.

The cyclic carbonate-based organic solvent is an organic solvent capable of well dissociating the lithium salt in the electrolyte due to high permittivity as a highly viscous organic solvent, wherein specific examples thereof may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein, as a representative example, at least one organic solvent selected from the group consisting of dimethyl carbonate (DMC), diethyl carbonate (DEC), dipropyl carbonate, ethylmethyl carbonate (EMC), methylpropyl carbonate, and ethylpropyl carbonate may be used, and the linear carbonate-based organic solvent may specifically include ethylmethyl carbonate (EMC).

Furthermore, in order to prepare an electrolyte solution having high ionic conductivity, the organic solvent may further include a linear ester-based organic solvent and/or a cyclic ester-based organic solvent in addition to the cyclic carbonate-based organic solvent and/or the linear carbonate-based organic solvent.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

Any organic solvent typically used in an electrolyte solution for a lithium secondary battery may be added and used without limitation as the organic solvent, if necessary. For example, at least one organic solvent selected from an ether-based organic solvent, an amide-based organic solvent, and a nitrile-based organic solvent may be further included.

Lithium Secondary Battery

Next, a lithium secondary battery according to the present invention will be described. The lithium secondary battery according to an embodiment of the present invention includes a positive electrode, a negative electrode, and the electrolyte for a lithium secondary battery, and selectively further includes a separator. Since the electrolyte for a lithium secondary battery is the same as described above, a detailed description thereof will be omitted.

(1) Positive Electrode

The positive electrode may be prepared by coating a positive electrode collector with a positive electrode active material slurry including a positive electrode active material, a binder, an electrode conductive agent, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (where $0<Y1<1$), $LiMn_{2-Z1}Ni_{Z1}O_4$ (where $0<Z1<2$), etc.), lithium-nickel-cobalt-based oxide (e.g., $LiNi_{1-Y2}Co_{Y2}O_2$ (where $0<Y2<1$), lithium-manganese-cobalt-based oxide (e.g., $LiCo_{1-Y3}Mn_{Y3}O_2$ (where $0<Y3<1$), $LiMn_{2-Z2}Co_{Z2}O_4$ (where $0<Z2<2$), etc.), lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$) or $Li(Ni_{p2}Co_{q2}Mn_{r2})O_4$ (where $0<p2<2$, $0<q2<2$, $0<r2<2$, and $p2+q2+r2=2$), etc.), or lithium-nickel-cobalt-transition metal (M) oxide (e.g., $Li(Ni_{p3}Co_{q3}Mn_{r3}M_{S1})O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s1 are atomic fractions of each independent elements, wherein $0<p3<1$, $0<q3<1$, $0<r3<1$, $0<S1<1$, and $p3+q3+r3+S1=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The binder is a component that assists in the binding between the active material and the conductive agent and in the binding with the current collector, wherein examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene (PE), polypropylene, an ethylene-propylene-diene terpolymer (EPDM), a sulfonated EPDM, a styrene-butadiene rubber, a fluoro rubber, various copolymers, and the like.

The electrode conductive agent is a component for further improving the conductivity of the positive electrode active material, wherein any electrode conductive agent may be used without particular limitation so long as it has conductivity without causing adverse chemical changes in the battery, and, for example, a conductive material, such as: graphite; a carbon-based material such as carbon black, acetylene black, Ketjen black, channel black, furnace black, black; conductive fibers such as lamp black, and thermal carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include an organic solvent, such as N-methyl-2-pyrrolidone (NMP), and may be used in an amount such that desirable viscosity is obtained when the positive electrode active material as well as selectively the binder and the conductive agent is included.

(2) Negative Electrode

The negative electrode, for example, may be prepared by coating a negative electrode collector with a negative electrode active material slurry including a negative electrode active material, a binder, a conductive agent, and a solvent.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

The negative electrode active material may include at least one negative electrode active material selected from the group consisting of natural graphite, artificial graphite, a carbonaceous material; lithium-containing titanium composite oxide (LTO); metals (Me) such as silicon (Si), tin (Sn), lithium (Li), zinc (Zn), Mg, cadmium (Cd), cerium (Ce), nickel (Ni), or Fe; alloys composed of the metals (Me); oxides (MeOx) of the metals (Me); and composites of the metals (Me) and carbon.

The binder is a component that assists in the binding between the conductive agent, the active material, and the current collector, wherein examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as N-methyl-2-pyrrolidone (NMP), and may be used in an amount such that desirable viscosity is obtained when the negative electrode active material as well as selectively the binder and the conductive agent are included.

(3) Separator

A typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator, and a typical porous nonwoven fabric, for example, a nonwoven fabric formed of high melting point glass fibers or polyethylene terephthalate fibers may be used, but the present invention is not limited thereto.

Hereinafter, the present invention will be described in detail, according to specific examples. However, the following examples are merely presented to exemplify the present invention, and the scope of the present invention is not limited thereto. It will be apparent to those skilled in the art that various modifications and alterations are possible within the scope and technical spirit of the present invention. Such modifications and alterations fall within the scope of claims included herein.

EXAMPLES

1. Example 1

(1) Preparation of Electrolyte for Lithium Secondary Battery

A non-aqueous organic solvent was prepared by mixing ethylene carbonate (EC) and ethyl methyl carbonate (EMC), as organic solvents, in a volume ratio of 30:70 and adding $LiPF_6$ in the mixture to have a concentration of 1 M. An electrolyte for a lithium secondary battery was prepared by adding 0.5 g of the compound represented by Formula 1E-1 and 0.2 g of the oligomer represented by Formula 2A-1 (weight-average molecular weight (Mw)=7, 400 g/mol, p'=5, and q=10) to 99.3 g of the non-aqueous organic solvent.

(2) lithium Secondary Battery Preparation

A positive electrode active material ($Li(Ni_{0.8}Co_{0.1}Mn_{0.1})O_2$; NCM), carbon black as a conductive agent, and polyvinylidene fluoride (PVDF), as a binder, were added in a weight ratio of 97:1.5:1.5 to N-methyl-2-pyrrolidone (NMP), as a solvent, to prepare a positive electrode active material slurry. An about 20 μm thick aluminum (Al) thin film, as a positive electrode collector, was coated with the positive electrode active material slurry, dried, and roll-pressed to prepare a positive electrode.

A negative electrode active material (carbon powder: SiO=90:5 weight ratio), a styrene-butadiene rubber (SBR) as a binder, carboxymethylcellulose (CMC) as a thickener, and carbon black, as a conductive agent, were added in a weight ratio of 95:3:1:1 to N-methyl-2-pyrrolidone (NMP), as a solvent, to prepare a negative electrode active material slurry. A 10 μm thick copper (Cu) thin film, as a negative electrode collector, was coated with the negative electrode active material slurry, dried, and roll-pressed to prepare a negative electrode.

After an electrode assembly was prepared by using the positive electrode, the negative electrode, and a separator formed of three layers of polypropylene/polyethylene/polypropylene (PP/PE/PP), the electrode assembly was accommodated in a pouch-type secondary battery case, and the electrolyte for a lithium secondary battery was then injected into the pouch-type secondary battery case to prepare a lithium secondary battery.

2. Example 2

A liquid electrolyte for a lithium secondary battery and a lithium secondary battery were prepared in the same manner as in Example 1 except that 5.0 g of the compound represented by Formula 1E-1 and 0.2 g of the oligomer represented by Formula 2A-1 (weight-average molecular weight (Mw)=7, 400 g/mol, p'=5, and q=10) were added to 94.8 g of the non-aqueous organic solvent.

3. Example 3

A liquid electrolyte for a lithium secondary battery and a lithium secondary battery were prepared in the same manner as in Example 1 except that 0.5 g of the compound represented by Formula 1B-1, instead of 0.5 g of the compound represented by Formula 1E-1, was added.

4. Example 4

A liquid electrolyte for a lithium secondary battery and a lithium secondary battery were prepared in the same manner as in Example 2 that 5.0 g of the compound represented by Formula 1B-1, instead of 5.0 g of the compound represented by Formula 1E-1, was added.

5. Example 5

A liquid electrolyte for a lithium secondary battery and a lithium secondary battery were prepared in the same manner as in Example 3 except that 0.2 g of the oligomer represented by Formula 2B-1 (weight-average molecular weight (Mw)= 7, 570 g/mol, p"=5, and q'=10), instead of 0.2 g of the oligomer represented by Formula 2A-1, was added.

6. Example 6

A liquid electrolyte for a lithium secondary battery and a lithium secondary battery were prepared in the same manner as in Example 1 except that 0.5 g of the compound represented by Formula 1B-1 and 5.0 g of the oligomer represented by Formula 2A-1 (weight-average molecular weight (Mw)=7, 400 g/mol, p'=5, and q=10) were added to 94.5 g of the non-aqueous organic solvent.

7. Example 7

A liquid electrolyte for a lithium secondary battery and a lithium secondary battery were prepared in the same manner as in Example 6 except that 5 g of the oligomer represented by Formula 2B-1 (weight-average molecular weight (Mw)= 7,570 g/mol, p"=5, and q'=10), instead of the oligomer represented by Formula 2A-1, was added.

COMPARATIVE EXAMPLES

1. Comparative Example 1

An electrolyte for a lithium secondary battery and a lithium secondary battery were prepared in the same manner as in Example 1 except that the compound represented by Formula 1E-1 was not added when the electrolyte for a lithium secondary battery was prepared.

2. Comparative Example 2

An electrolyte for a lithium secondary battery and a lithium secondary battery were prepared in the same manner as in Example 1 except that the oligomer represented by Formula 2A-1 was not added when the electrolyte for a lithium secondary battery was prepared.

3. Comparative Example 3

An electrolyte for a lithium secondary battery and a lithium secondary battery were prepared in the same manner as in Example 1 except that both the compound represented by Formula 1E-1 and the oligomer represented by Formula 2A-1 were not added when the electrolyte for a lithium secondary battery was prepared.

EXPERIMENTAL EXAMPLES

1. Experimental Example 1: High-Temperature (45° C.) Capacity Retention and Resistance Increase Rate Measurement After formation was performed on each of the lithium secondary batteries prepared according to Examples 1 to 7 and Comparative Examples 1 to 3 at a current of 200 mA (0.1 C rate), discharge capacity in this case was set as initial capacity and resistance measured in this case was set as initial resistance. Thereafter, CC/CV charging at 660 mA (0.33 C, 0.05 C cut-off) to 4.2 V and CC discharging at 660 mA (0.33 C) to 2.5 V were performed 200 times at a high temperature (45° C.), respectively, and discharge capacity and resistance were then measured. $200^{th}$ discharge capacity measured in this case and the initial capacity were compared to calculate capacity retention, resistance measured in this case and the initial resistance were compared to calculate a resistance increase rate, and the results thereof are presented in Table 1.

TABLE 1

|  | Capacity retention (%) | Resistance increase rate (%) |
|---|---|---|
| Example 1 | 98.0 | 1.5 |
| Example 2 | 89.2 | 10.2 |
| Example 3 | 98.5 | 1.2 |
| Example 4 | 95.2 | 5.4 |
| Example 5 | 96.5 | 3.5 |
| Example 6 | 92.1 | 9.5 |
| Example 7 | 90.2 | 12.7 |
| Comparative Example 1 | 82.4 | 25.4 |
| Comparative Example 2 | 85.3 | 22.9 |
| Comparative Example 3 | 74.5 | 35.7 |

Referring to Table 1, it may be confirmed that capacity retentions of the lithium secondary batteries prepared according to the examples were all higher than those of the secondary batteries prepared according to the comparative examples, but their resistance increase rates were all lower.

2. Experimental Example 2: High-Temperature (60° C.) Storage Characteristics Measurement Discharge capacity, after each of the lithium secondary batteries prepared according to Examples 1 to 7 and Comparative Examples 1 to 3 was charged at 0.33 C rate to 4.2 V under a constant current/constant voltage condition, cut-off charged at 0.05 C, and discharged at 0.33 C to 2.5 V, was set as initial capacity, and resistance in this case was set as initial resistance. Subsequently, residual capacity and resistance, after each lithium secondary battery was charged at 0.33 C rate to 4.2 V under a constant current/constant voltage condition, cut-off charged at 0.05 C, and stored at 60° C. for 10 weeks, were measured. In this case, discharge capacity measured and the initial capacity were compared to calculate capacity retention, resistance measured in this case and the initial resistance were compared to calculate a resistance increase rate, and the results thereof are presented in Table 2.

TABLE 2

|  | Capacity retention (%) | Resistance increase rate (%) |
|---|---|---|
| Example 1 | 95.4 | 5.4 |
| Example 2 | 80.3 | 21.2 |
| Example 3 | 97.5 | 3.5 |
| Example 4 | 91.2 | 10.5 |
| Example 5 | 92.5 | 8.1 |
| Example 6 | 84.7 | 5.4 |
| Example 7 | 81.5 | 25.8 |
| Comparative Example 1 | 72.9 | 36.5 |

TABLE 2-continued

|  | Capacity retention (%) | Resistance increase rate (%) |
|---|---|---|
| Comparative Example 2 | 75.2 | 32.4 |
| Comparative Example 3 | 67.5 | 49.2 |

Referring to Table 2, it may be confirmed that, with respect to the lithium secondary batteries prepared according to the examples, resistance increase rates were lower than those of the lithium secondary batteries prepared according to the comparative examples while residual capacity retentions during high-temperature storage were higher.

3. Experimental Example 3: High-Temperature Safety Test

The lithium secondary batteries prepared according to Examples 1 to 7 and Comparative Examples 1 to 3 were stored at a high temperature of 60° C. for 10 weeks at a state of charge (SOC) of 100% (4.15 V). Thereafter, after 10 weeks, a volume increase rate was measured based on a volume of the battery measured at an initial stage (1 week). The results thereof are presented in Table 3 below.

TABLE 3

|  | Volume increase rate after storage at 60° C. for 10 weeks (%) |
|---|---|
| Example 1 | 7.5 |
| Example 2 | 25.4 |
| Example 3 | 5.1 |
| Example 4 | 12.4 |
| Example 5 | 10.5 |
| Example 6 | 18.4 |
| Example 7 | 28.5 |
| Comparative Example 1 | 39.5 |
| Comparative Example 2 | 38.4 |
| Comparative Example 3 | 50.6 |

Referring to Table 3, since the lithium secondary batteries prepared according to the examples had lower volume increase rates even during high-temperature storage than the lithium secondary batteries prepared according to the comparative examples, it may be confirmed that safety of the batteries was better even in a case where the lithium secondary batteries were stored for a long period of time at high temperature.

4. Experimental Example 4: Anion Stabilization Evaluation

After each of the electrolytes for a lithium secondary battery prepared in Examples 1, 2, 3, and 6 and the electrolytes for a lithium secondary battery prepared in Comparative Examples 1 to 3 was stored at 60° C. for 2 weeks, a degree of anion stabilization was evaluated by checking an integration value of a $PO_2F_2$ peak of each electrolyte using a nuclear magnetic resonance (NMR) analyzer (1H Bruker 700 MHz NMR, solvent tetramethylsilane (TMS)). The results thereof are presented in Table 4 below. In this case, it denotes that the higher the integration value of the $PO_2F_2$ peak is, the more unstable the $PO_2F_2$ is because $PF_6^-$ anions are further decomposed.

TABLE 4

|  | Integration value of $PO_2F_2$ peak |
|---|---|
| Example 1 | 0.95 |
| Example 2 | 0.71 |
| Example 3 | 1.02 |
| Example 6 | 0.75 |
| Comparative Example 1 | 2.54 |
| Comparative Example 2 | 1.01 |
| Comparative Example 3 | 3.12 |

With respect to the electrolytes for a lithium secondary battery prepared according to Examples 1, 2, 3, and 6, it may be confirmed that degrees of anion stabilization were higher than those of the electrolytes for a lithium secondary battery prepared in Comparative Examples 1 to 3.

The invention claimed is:

1. An electrolyte for a lithium secondary battery, the electrolyte comprising:
   an additive containing a compound represented by Formula 1;
   an oligomer containing a unit represented by Formula 2 and having an acrylate group at an end thereof;
   a lithium salt; and
   an organic solvent:

[Formula 1]

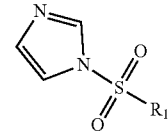

wherein, in Formula 1,
   $R_1$ is selected from the group consisting of an alkyl group having 1 to 5 carbon atoms which is unsubstituted or substituted with a halogen, an alkoxy group having 1 to 5 carbon atoms which is unsubstituted or substituted with a halogen, a phenyl group which is substituted or unsubstituted with an alkyl group having 1 to 3 carbon atoms, and an amine group which is unsubstituted or substituted with an alkyl group having 1 to 5 carbon atoms,

[Formula 2]

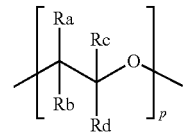

wherein, in Formula 2,
   $R_a$, $R_b$, $R_c$, and $R_d$ are each independently fluorine or an alkyl group having 1 to 3 carbon atoms which is unsubstituted or substituted with fluorine, and p is an integer of 1 to 50, wherein the oligomer comprises an oligomer represented by Formula 2A or 2B:

[Formula 2A]

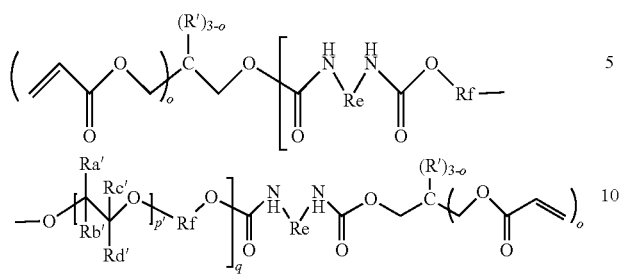

wherein, in Formula 2A, $R_a'$, $R_b'$, $R_c'$, and $R_d'$ are each independently fluorine or an alkyl group having 1 to 3 carbon atoms which is unsubstituted or substituted with fluorine, $R_e$ is an aliphatic hydrocarbon group or an aromatic hydrocarbon group, $R_f$ is an alkylene group having 1 to 5 carbon atoms which is unsubstituted or substituted with fluorine, R' is hydrogen or an alkyl group having 1 to 3 carbon atoms, o is an integer of 1 to 3, p' is an integer of 1 to 50, and q is an integer of 1 to 15,

[Formula 2B]

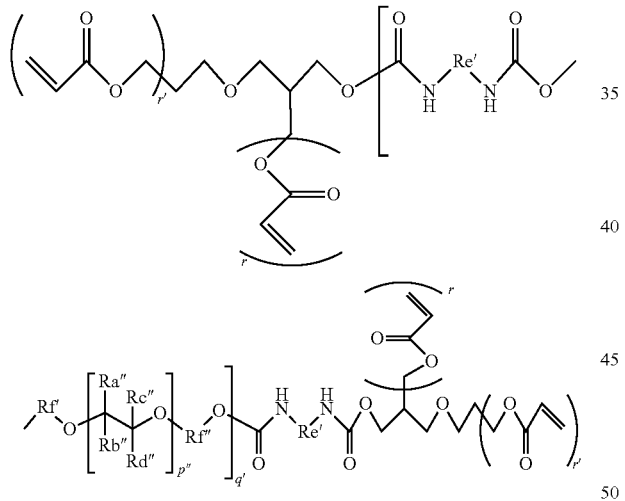

wherein, in Formula 2B, $R_a''$, $R_b''$, $R_c''$, and $R_d''$ are each independently fluorine or an alkyl group having 1 to 3 carbon atoms which is unsubstituted or substituted with fluorine, $R_e'$ is an aliphatic hydrocarbon group or an aromatic hydrocarbon group, $R_f'$ is an alkylene group having 1 to 5 carbon atoms which is unsubstituted or substituted with fluorine, r is an integer of 1 to 2, r' is an integer of 1 to 3, p'' is an integer of 1 to 50, and q' is an integer of 1 to 15.

2. The electrolyte for a lithium secondary battery of claim 1, wherein the compound represented by Formula 1 comprises at least one selected from the group consisting of compounds represented by Formulae 1A to 1E:

[Formula 1A]

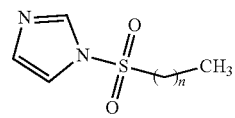

wherein, in Formula 1A, n is an integer of 0 to 4,

[Formula 1B]

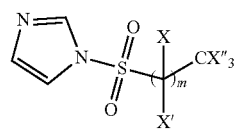

wherein, in Formula 1B, m is an integer of 0 to 4, X, X', and X'' are each independently hydrogen or a halogen, and at least one of X, X', or X'' is a halogen,

[Formula 1C]

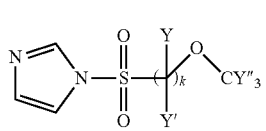

wherein, in Formula 1C, k is an integer of 0 to 4, Y, Y', and Y'' are each independently hydrogen or a halogen, and at least one of Y, Y', or Y'' is a halogen,

[Formula 1D]

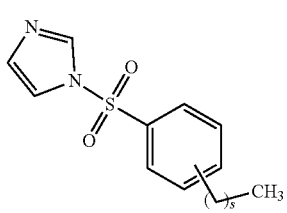

wherein, in Formula 1D, s is an integer of 0 to 2,

[Formula 1E]

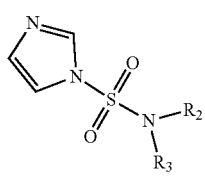

wherein, in Formula 1E, $R_2$ and $R_3$ are each independently hydrogen or an alkyl group having 1 to 5 carbon atoms.

3. The electrolyte for a lithium secondary battery of claim 2, wherein the compound represented by Formula 1A comprises at least one selected from the group consisting of compounds represented by Formulae 1A-1 to 1A-3:

[Formula 1A-1]
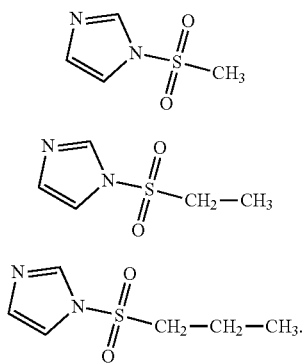
[Formula 1A-2]
[Formula 1A-3]

4. The electrolyte for a lithium secondary battery of claim 2, wherein the compound represented by Formula 1B comprises a compound represented by Formula 1B-1:

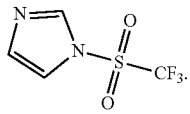
[Formula 1B-1]

5. The electrolyte for a lithium secondary battery of claim 2, wherein the compound represented by Formula 1C comprises at least one selected from the group consisting of compounds represented by Formulae 1C-1 to 1C-5:

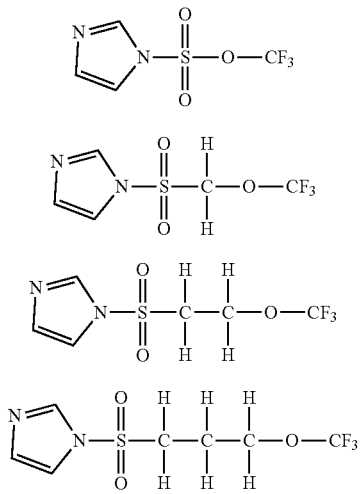
[Formula 1C-1]
[Formula 1C-2]
[Formula 1C-3]
[Formula 1C-4]

[Formula 1C-5]
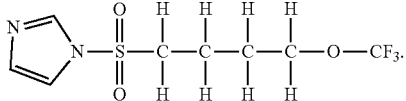

6. The electrolyte for a lithium secondary battery of claim 2, wherein the compound represented by Formula 1D comprises a compound represented by Formula 1D-1:

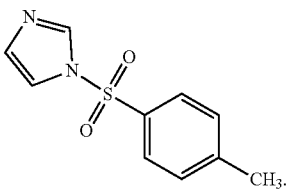
[Formula 1D-1]

7. The electrolyte for a lithium secondary battery of claim 2, wherein the compound represented by Formula 1E comprises a compound represented by Formula 1E-1:

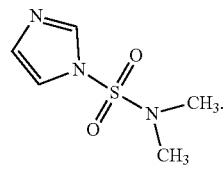
[Formula 1E-1]

8. The electrolyte for a lithium secondary battery of claim 1, wherein the compound represented by Formula 1 is included in an amount of 0.1 part by weight to 5 parts by weight based on 100 parts by weight of the electrolyte.

9. The electrolyte for a lithium secondary battery of claim 1, wherein the compound represented by Formula 1 is included in an amount of 0.1 part by weight to 3 parts by weight based on 100 parts by weight of the electrolyte.

10. The electrolyte for a lithium secondary battery of claim 1, wherein the oligomer is included in an amount of 0.1 part by weight to 5 parts by weight based on 100 parts by weight of the electrolyte.

11. The electrolyte for a lithium secondary battery of claim 1, wherein the lithium salt comprises at least one $LiPF_6$ or $LiBF_4$.

12. A lithium secondary battery, comprising:
a positive electrode;
a negative electrode;
a separator; and
the electrolyte of claim 1.

* * * * *